United States Patent [19]

Dieterich et al.

[11] 3,983,081

[45] Sept. 28, 1976

[54] INORGANIC-ORGANIC COMPOSITION

[75] Inventors: Dieter Dieterich; Peter Markusch, both of Leverkusen, Germany

[73] Assignee: Bayer Aktiengesellschaft, Leverkusen, Germany

[22] Filed: Feb. 27, 1974

[21] Appl. No.: 446,577

[30] Foreign Application Priority Data

Feb. 2, 1973  Germany.............................. 2310559

[52] U.S. Cl................... 260/2.5 AJ; 260/2.5 AK; 260/29.2 TN; 260/37 N; 260/77.5 SS

[51] Int. Cl.²................... C08G 18/14; C08K 3/34; C08K 5/51

[58] Field of Search................ 260/2.5 AJ, 2.5 AK, 260/37 N, 77.5 SS, 29.2 TN

[56] References Cited
UNITED STATES PATENTS

| | | | |
|---|---|---|---|
| 3,211,675 | 10/1965 | Johnson | 260/2.5 AK |
| 3,354,099 | 11/1967 | Stegeman | 260/2.5 AK |
| 3,510,323 | 5/1970 | Wismer | 260/2.5 AK |
| 3,607,794 | 9/1971 | Abbotson | 260/2.5 AK |
| 3,634,342 | 1/1972 | Boblitt | 260/2.5 AK |
| 3,655,600 | 4/1972 | Stevens | 260/2.5 AK |
| 3,763,070 | 10/1973 | Shearing | 260/2.5 AK |
| 3,798,186 | 3/1974 | Nakade | 260/2.5 AK |

FOREIGN PATENTS OR APPLICATIONS

| | | | |
|---|---|---|---|
| 1,362,003 | 4/1964 | France | 260/2.5 AK |
| 1,419,552 | 10/1965 | France | 260/2.5 AK |
| 1,137,465 | 12/1968 | United Kingdom | 260/2.5 AK |
| 1,192,864 | 5/1970 | United Kingdom | 260/2.5 AK |

*Primary Examiner*—C. Warren Ivy
*Attorney, Agent, or Firm*—Joseph C. Gil; Gene Harsh

[57] ABSTRACT

Inorganic-organic compositions obtained from a mixture of components comprising:
a. from 5–98% by weight of an organic polyisocyanate
b. from 2–95% by weight of an aqueous alkali metal silicate solution containing about 20–70% by weight of said alkali metal silicate
c. from 0–93% by weight of a water-binding component and
d. from 1–30% by weight of a halogen or phosphorus containing compound, based on the total weight of (a), (b), (c) with the proviso that when (c) is 0–20% by weight (a) contains 2–200 milliequivalents of ionic groups per 100 grams of said polyisocyanate. The products of the invention may be used in many forms including both porous and non-porous products as surface coatings having good adhesion and resistance to abrasion, as a mortar, and as a foam concrete for making molded products particularly in construction engineering and civil engineering as for building walls, igloos, road building and the like.

28 Claims, No Drawings

INORGANIC-ORGANIC COMPOSITION

This invention relates generally to synthetic materials and more particularly to an improved inorganic-organic material formed, generally speaking, by reacting an organic polyisocyanate with an aqueous solution of an alkali metal silicate optionally also with a water-binding component present.

It is known that polyurethane or polyurea plastics can be produced from organic polyisocyanates and compounds containing active hydrogen atoms which react with -NCO groups. The properties of this class of polymers vary widely. High strength, elasticity and abrasion resistance are particularly valuable properties of these products. On the other hand, their heat stability and in particular their permanent dimensional stability at temperatures above 120°C are only moderate. The use of these products as building and structural elements is limited on account of their unfavorable flame resistance. Although their flame resistance can be improved through the incorporation of flame proofing agents, their mechanical properties are generally adversely affected in this way.

It is also known that inorganic silica-gel materials can be prepared from aqueous solutions of alkali silicates by the action of acids or precursors of acids such as anhydrides. Materials of this kind have acquired particular significance as adhesives, surface-coatings and the like. Lightweight foams have also been produced on the basis of waterglass. Products such as those show high dimensional stability under heat and are completely non-inflammable. However, they are brittle and of fairly limited strength. As foams they have no real load-bearing capability and crumble under pressure. It would be extremely desirable to combine with one another the favorable properties of the inorganic materials and of organic plastics materials and to eliminate the undesirable properties of both.

Accordingly, there has been no shortage of attempts to produce composite plastics although none of these attempts has ever reached the required objective.

For example, polyurethanes have been mixed with active silica as a filler and subsequently the resulting mixture has been vulcanized as in U.S. Pat. No. 3,395,129. There are some signs in this case of a strengthening effect, as in cases where highly active carbon black is used. The tensile strength and the modulus increase while the breaking elongation decreases. However, the basic property spectrum of the material is not affected by the use of silica, probably because there is a two-phase system in which only the polyurethane forms a coherent phase while the silica is incorporated therein as an incoherent phase. The incoherent zones have diameters of the order of 3 to 100 microns. Accordingly, the known two-phase systems are relatively coarse, heterogeneous two-phase systems. The interaction between the two phases is very limited both on account of the relatively small interface and because of the very different chemical nature of the two phases.

It is also known to use silica in plastics in the form of microfibers. In this case, the strengthening effect increases by virtue of the specific structure although, on the other hand, the incoherent phase inevitably become larger so that the chemical interaction between the two phases decreases. But none of the foregoing alters the coarse heterogeneous two-phase character of the plastic.

In addition, it has been proposed in U.S. Pat. No. 3,607,794 to react an aqueous solution of an alkali silicate with a monomeric polyisocyanate, for example 4,4'-diphenylmethane diisocyanate. In most cases, this reaction gives foams in which the isocyanate phase reacts with the water and the carbon dioxide formed foams the mass, some of the carbon dioxide reacting only with the immediately adjacent aqueous silicate phase to give some gel formation but inadequate penetration to give complete uniform gelling.

The reaction is preferably carried out with a predominant quantity of waterglass so that a mixture is formed which is an emulsion of the isocyanate in a coherent silicate solution. Accordingly, the resulting foam is in character a silicate foam which contains incoherent foamed polyurea zones. The properties of a foam of this kind are not really any different from those of a pure silicate foam. In fact, foams produced in this way have the disadvantage of being generally highly water retentive, brittle and of insufficient mechanical strength for their gross density to be suitable for use as construction materials, for example, foam concrete.

Although the organic polyisocyanate which is added to the silicate solution acts as hardener, it has little effect upon the properties of the foam formed. Any effect it may have is frequently a negative effect. Obviously, in the final product the organic portion is present substantially as a filler in the completed silicate skeleton.

On the oher hand, when an excess of polyisocyanate is used in the proces of U.S. Pat. No. 3,607,794 polyurea foams containing a dispersed incoherent silicate phase are obtained. Accordingly, the properties are substantially those of a silica-filled polyurea foam with high flammability and extreme brittleness.

If the teaching of U.S. Pat. No. 3,607,794 is followed, it can be seen that mixtures of aqueous silicate solution and organic polyisocyanates form only relatively coarse-particle emulsions. Although this disadvantage can be reduced to a large extent by the recommended use of surfactants which make the primary emulsions more finely divided and stable, the property spectrum still remains unsatisfactory. While the surfactants effect a reduction in particle size, the use of surfactants leads to poor compression strength in the final products. In particular, composite materials obtained show pronounced brittleness and limited compression strength. It must be concluded from the results hitherto obtained that composite foams of silicates and organic materials do not have any decisive advantages over pure organic or pure inorganic materials.

It has been also proposed in French patents Nos. 1,362,003 and 1,419,552 to use polyisocyanates, alkali metal silicates and polyether or polyester resins to make foams but the resulting rigid products, like those produced in accordance with U.S. Pat. No. 3,607,794 are brittle and have low compression strength. Flexible products made in accordance with these French patents have poor tensile strength.

It is also known that aggregates can be produced from mineral granules and synthetic resins. Processes for producing synthetic resin concrete from porous mineral materials and mixtures which are capable of foaming are known in the art (German Auslegeschrift No. 1,239,229).

In these cases, the mineral material is always included within and bonded together by synthetic resin. Synthetic resin concretes produced in this way have, however, the disadvantage of not being homogeneous so that they are subjected to different degrees of mechanical stress in different zones. Moreover, it is often necesary to use considerable quantities of more than about 30% by weight of an organic synthetic resin which is not only expensive but which also, in most cases, reduces the flame resistance.

It is already known that concrete conventionally used for building purposes can be diluted by the addition of organic porous synthetic resins such a foamed polystyrene and it is also known to add blowing agents such as air to concrete mixtures or to produce gases in situ by adding, for example, aluminum which evolves hydrogen by reactions with the watercement mixture, in order to obtain porous materials with low gross densities.

The disadvantages of those substantially inorganic materials are their relatively long setting times, their relatively high brittleness and their low thermal insulation, compared with organic foam structures.

It is also known to produce structural elements from porous organic synthetic resins with solid, fire-resistant covering layers which are in most cases inorganic or metallic.

Owing to their organic nature, these materials have the disadvantage that they cannot be used as building materials without fire-retarding covering layers.

It is also known to produce cement masses from hydraulic cement, a non-aqueous silica filler such as sand and an organic compound which contains a plurality of isocyanate groups (German Offenlegungsschrift No. 1,924,468). The main disadvantages of these porous cement masses is that they still have comparatively long setting times of 5–6 hours and poor thermal insulation properties.

Heat-resistant foams can be obtained from thermoplastic synthetic resins which can be foamed or are already cellular by working them up in the presence of aqueous alkali metal silicate solutions (German Auslegeschrift No. 1,494,955). The disadvantages of this process are the large heat supply required to foam the thermoplastic resin, the problem of hardening the alkali metal silicate solutions and the water content of the resulting composite material.

It is an object of the invention to provide improved inorganic-organic compositions which are devoid of the foregoing disadvantages. Another object of the invention is to provide inorganic-organic compositions of high strength, rebound elasticity and dimensional stability even at high temperatures which are substantially non-inflammable.

A more specific object of the invention is to obviate the above described disadvantages of known foam materials and to produce an organic-inorganic foam material which combines the advantages of rapid setting times, high compression strength compared to the gross density, high thermal and acoustic insulation, high-flame resistance and excellent resistance to fire.

The foregoing objects and others which will become apparent from the following description are accomplished in accordance with the invention, generally speaking, by providing an inorganic-organic composition obtained from a mixture of components comprising:

a. from 5–98% by weight of an organic polyisocyanate, b. from 2–95% by weight of an aqueous alkali metal silicate solution containing about 20–70% by weight of said alkali metal silicate, c. from 0–93% by weight of a water-binding component and d. from 1–30% by weight of a halogen or phosphorus containing compound based on the total weight of (a), (b), (c) with the proviso that when (c) is 0–20% by weight (a) contains 2–200 milliequivalents of ionic groups per 100 grams of said polyisocyanate. Any suitable halogen or phosphorus containing compound may be used as more particularly set forth below.

It is preferable, but not essential because any excess water-binding component could serve as only filler material, to have at least enough water present in the reaction mixture to combine with substantially all of said water-binding component. If desired an additional amount of water may be added.

Thus, a product and process, therefore, has now been found by which it is possible to produce macroscopically completely homogeneous inorganic-organic compositions which are xerosol materials of the solid/solid type, similar to the known ABS-plastics, in their colloidal nature, but have entirely different properties. Xerosols are dispersions of solid or liquid materials in a coherent solid. The completely new composite materials obtained in this way are extremely high-quality compositions which are advantageously distinguished in their properties from pure organic or pure inorganic materials. They are distinguished in particular by high strength, rebound elasticity, dimensional stability under heat and substantial non-inflammability.

It has surprisingly been found that these inorganic-organic materials of high strength, rebound elasticity, dimensional stability when heated and substantial non-inflammability can be obtained by homogeneously mixing said polyisocyanate with said aqueous solutions of alkali silicates, if required with the appropriate amount of said water-binding component present, and allowing the sol formed to react to form a xerosol. The colloidal dispersion and mutual penetration of the two phases is believed to be an essential criteria, making possible high specific surface and interfacial interactions such as are characteristic of xerosols. Best properties are obtained with the organic phase being continuous.

The invention more particularly set forth below and as claimed herein is directed to an unexpected improvement in the flame resistance even beyond that which is possible with only components (a), (b) and optionally (c) as set forth above. Thus when only (a), (b) and optionally (c) are combined a product is obtained which is not entirely stable in a fire. Under a direct flame the water glass has a tendency to exude from the material and even to melt and fall out of the composition so that the supporting inorganic structure is completely lost.

It was quite unexpected that by adding the halogen or phosphorus containing compound one can improve the flame resistance of inorganic portions of the material. It is also an advantage of the invention that the added components have no detrimental effect on the product but they do react at temperatures above about 400°C to form a reaction product with the sodium carbonate with the evolution of cabon dioxide which helps to extinguish the flame. In many instances other compounds including e.g. sodium chloride, sodium bromide, sodium phosphate and the like result, and these compounds cannot react further with the silica dioxide, so the product remains very resistant to flame. Thus, when this paricular embodiment is used one obtains products suitable for the production, for example, the wall of building, that has greatly enhanced burn through resistance; that is when a flame is directed to the broad side of a wall, immediately further flame resistant reaction products result from a high temperature reaction of the halogen or phosphorus compound with the sodium carbonate to not only extinguish the flame, but also to prevent further flame spread.

We are not certain of the mechanism of the invention but it is apparent that products without the added halogen or phosphorus containing compound suffer from a reaction between the sodium carbonate formed during the process with the silica dioxide so that water glass which has a very low melting point is reformed, he resulting composition has poor compression strength and dimensional stability in a fire. On the contrary a product with vastly improved compression strength and dimensional stability is obtained with the added halogen or phosphorus containing compound.

Further, with the added halogen or phosphorus in even very intense heat so that the organic phase is completely consumed, there remains a fire resistant self supporting inorganic foam. Also there is no evolution of toxic gases such as HCl or HBr because other non-toxic products such as NaCl or NaBr are formed.

Suitable flame resistant compounds which contain halogen or phosphorus are e.g. tributylphosphate, tris-(2,3-dichloropropyl)phosphate, polyoxypropylene-chloromethylphosphonate, cresyldiphenylphosphate, tricresylphosphate, tris(-$\beta$-chloroethyl)phosphate, tris-(2,3-dichloropropyl)phosphate, triphenylphosphate, ammoniumphosphate, perchlorinated diphenyl, perchlorinated terphenyl, hexabromocyclodecane, tribromophenol, dibromopropyldiene, hexabromobenzene, octabromodiphenylether, pentabromotoluol, poly-tribromostyrol, tris(bromocresyl)phosphate, tetrabromobisphenol A, tetrabromophthalic acid anhydride, octabromodiphenyl, tris-(dibromopropyl)phosphate, polyvinylchloride telomers, chloroparaffins as well as further phosphorus and/or halogen containing flame resistant compounds as they are described e.g. in "Kunststoff-Handbuch," Vol. VII, Munchen 1966, pages 110 – 111 which is incorporated herein by reference. The organic halogen containing components are, however, preferred.

By using the organic polyisocyanate containing an ionic group including, for example, isocyanato prepolymer ionomers, i.e. polyurea polymer precursors containing anionic and/or cationic groups, it is possible to obtain such a homogeneous dispersion of the organic and aqueous inorganic phases that sols are formed in which the disperse phase is present in dimensions of from about 20 nanometers (nm) to 2 microns, preferably from 50 nm to 700 nm, so that the chemical interactions increase by orders of magnitude and novel composite materials are obtained. In particular, it is also possible by using the polyisocyanates containing ionic groups to obtain a colloidal fiber structure so that both phases can be present as coherent systems. This means that a macroscopically and, in many cases, even a microscopically homogeneous composite material is obtained which combines the advantages of inorganic and organic compositions. Whether the water-binding component is present or not, it is strongly preferred to employ organic polyisocyanates containing ionic groups.

Accordingly, the present invention also relates to a process for the production of said inorganic-organic compositions of high strength, rebound elasticity, dimension stability even when hot and subsantial non-inflammability which is a polyurea ionomer-polysilicic acid gel composite material in the form of a colloidal xerosol, wherein an aqueous silicate solution is combined with a. an organic polyisocyanate
b. a water-binding component (i.e. another compound which hardens the water-soluble silicates), in the amounts and with proviso set forth above
c. from 1–30% by weight of a halogen or phosphorus containing compound and,
d. optionally further auxiliaries and additives, and the system thus obtained is allowed to react to completion.

The inorganic-organic composition of one preferred embodiment of the invention is distinguished by the fact that in addition to high molecular weight silicate, the resulting high molecular weight organic polyurea of the composite material contains substantially from 2 to 200 milliequivalents per 100 g of chemicaly bound ionic groups.

Any suitable organic polyisocyanate may be used. The average molecular weight of the organic polyisocyanate should preferably be between 300 and 8000 (most preferably between 400 and 5000). Suitable polyisocyanates include aliphatic, cycloaliphatic, araliphatic, aromatic or heterocyclic polyisocyanates such as those described e.g. by W. Siefken in Justus Liebigs Annalen der Chemie, 562, pages 75 to 136, for example ethylene diisocyanate; tetramethylene-1,4-diisocyanate; hexamethylene-1,6-diisocyanate; dodecane-1,12-diisocyanate; cyclobutane-1,3-diisocyanate; cyclohexane-1,3- and 1,4-diisocyanate and any mixtures of these isomers; 1-isocyanato-3,3,5-trimethyl-5-isocyanatomethyl-cyclohexane (German Auslegeschrift No. 1,202,785); hexahydrotolylene-2,4- and -2,6-diisocyanate and any mixtures of these isomers; hexahydrophenylene-1,3- and/or 1,4-diisocyanate, perhydrodiphenylmethane-2,4'- and/or -4,4'-diisocyanate; phenylene-1,3-and -1,4-diisocyanate; tolylene-2,4- and -2,6-diisocyanate and any mixures of these isomers; diphenylmethane-2,4'- and/or -4,4'-diisocyanate; naphthylene-1,5-diisocyanate; triphenylmethane 4,4',- 4''-triisocyanate; polyphenyl-polymethylene-polyisocyanates which may be obtained by aniline-formaldehyde condensation followed by phosgenation and which have been described e.g. in British Patent Specification No. 874,430 and 848,671; perchlorinated aryl polyisocyanates such as those described e.g. in German Auslegeschrift No. 1,157,601; polyisocyanates which contain carbodiimide groups as described in German Patent Specification No. 1,092,007; the diisocyanates described in U.S. Pat. Specification No. 3,492,330, polyisocyanates which contain allophanate groups as described e.g. in British Pat. Specification No. 994,890; Belgian Pat. Specification No. 761,626 and published Dutch Pat. Application No. 7,102,524; polyisocyanates which contain isocyanurate groups as described e.g. in German Pat. Specifications No. 1,022,789; 1,222,067 and 1,027,394 and in German Offenlegungsschriften No. 1,929,034 and 2,004,048; polyisocyanates which contain urethane groups as described e.g. in Belgian Pat. Specification No. 752,261 or in U.S. Pat. Specification No. 3,394,164; polyisocyanates which contain acylated urea groups in accordance with German Pat. Specification No. 1,230,778; polyisocyanates which contain biuret groups as described e.g. in German Pat. Specification No. 1,101,394; in British Pat. Specification No. 889,050 and in French Pat. Specification No. 7,017,514; polyisocyanates prepared by telomerization reactions as described e.g. in Belgian Pat. Specification No. 723,640; polyisocyanates which contain ester groups as described e.g. in British Pat. Specifications No. 965,474 and 1,072,956; in U.S. Pat. Specification No. 3,567,763 and in German Pat. Specification No. 1,231,688 and reaction products of the above mentioned isocyanates with acetals in accordance with German Pat. Specification No. 1,072,385.

The distillation residues which still contain isocyanate groups obtained from the commercial production of isocyanates are preferred and may be dissolved in one or more of the above mentioned polyisocyanates. Any mixtures of the above mentioned polyisocyanates may also be used.

It is generally preferred to use commercially readily available polyisocyanates such as polyphenyl-polymethylene-polyisocyanates obtained by aniline formaldehyde condensation followed by phosgenation ("crude MDI") and polyisocyanates which contain carbodiimide groups, urethane groups, allophanate groups, isocyanurate groups, urea groups or biuret groups ("modified polyisocyanates").

The isocyanate group can also be present in masked form for example, as a uretdione or caprolactam adduct. The polyisocyanates used in the process according to the invention preferably contain from about 2 to 10 more preferably from 2,2 to 4 isocyanato groups.

It is preferred to use polyisocyanates which contain ionic groups and it is particularly preferred to use polyisocyanates which contain sulphonic acid and/or sulphonate groups.

These isocyanates are prepared by a process in which liquid multi-component mixtures of aromatic polyisocyanates which have an isocyanate content of 10–42% by weight and a viscosity of 50–10,000 cP at 25°C are mixed with 0.1 to 10% by weight of sulphur trioxide or an equivalent quantity of oleum, sulphuic acid or chlorosulphonic acid at −20°C to +200°C and left until the reaction is completed, and the sulphonation products obtained in this way may then be partly or completely neutralized with a basic compound if desired (U.S. Ser. No. 363,436 filed May 24, 1973, now abandoned).

The ionic group content should amount to between 2 and 200 milliequivalents per 100 g of polyisocyanate. The ionic group content is more preferably between 3 and 100 milliequivalents per 100 g of polyisocyanate.

Suitable organic polyisocyanates also include prepolymers obtained by the so-called isocyanate-polyaddition process of the kind which have been repeatedly described over recent years. It is no problem to control virtually any known isocyanate reaction so that it can be stopped at least temporarily at a prepolymer stage. The prepolymers include not only adducts of polyisocyanates with alcohols, mercaptans, carboxylic acids, amines ureas and amides, but also reaction products of the foregoing polyisocyanates with themselves, such as uretdiones, isocyanurates, carbodiimides which can readily be obtained from monomeric polyisocyanates with an increase in molecular weight.

NCO-prepolymers particularly suitable for the process according to the invention are prepared by methods known per se, for example, by reacting polyhydroxyl compounds with a molecular weight of from about 400 to 5000, more especially polyhydroxyl polyesters and polyhydroxypolyethers, if desired in admixture with polyhydric alcohols with a molecular weight of less than 400, with excess quantities of polyisocyanates, for example hexamethylene diisocyanate, 2,4-tolylene diisocyanate, 2,6-tolylene diisocyanate, 4,4'-diisocyanatodiphenylmethane, etc.

In order to guarantee the required high compatability of the organic polyisocyanates with the aqueous silicate solution in the absence of at least 20% by weight of a water-binding component, it is necessary for the organic polyisocyanate to contain ionic groups and even a very low ionic group content is actually sufficient, for example, to have 2 milliequivalents of ionic groups /100 g of said organic polyisocyanate. The ionic group content preferably amounts to 3-100 milliequivalents/100 g. Ionic groups are not only preformed salt groups, such as for example

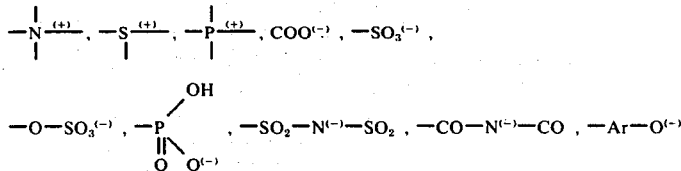

wherein Ar is $C_6-C_{14}$ aryl such as phenyl, naphthyl and the like, but also groups of the kind which form salt groups in the presence of alkali silicate, for example

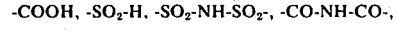

and also phenolic OH-groups. Two or more of the aforementioned groups can of course also be present. Organic polyisocyanates containing an anionic and a cationic group in the same molecule or complexes containing anionic and cationic polyisocyanates at the same time, can also be present.

Particularly preferred ion-forming groups are tert.-

-COOH, -SO$_3$H, -Ar-OH wherein Ar has the above meaning. Of these, the tertiary amino group has to be converted into a quaternary ammonium group before combination with the alkali silicate solution, for which purpose alkylating agents and also inorganic or organic acids are suitable.

Ionic modification carried out in the usual way gives polyisocyanates which frequently have a viscosity of greater than 50 cP and, in some cases, up to 100,000 cP/25°C and higher. In cases where viscosities as high as these are a disadvantage in further processing, the viscosity can be reduced by using low-viscosity isocyanates or even by adding inert solvents such as acetone, diethyl ether of diethylene glycol, ethyl acetate and the like. In addition, the duration of the hardening process can be extended by combining polyisocyanates containing ionic groups with conventional low-viscosity isocyanates.

Particularly preferred polyisocyanates are prepared by sulphonating aromatic polyisocyanates. In the simplest case, it is sufficient to react the polyisocyanates with concentrated sulphuric acid or oleum or sulfur trioxide. These products can either be directly mixed with aqueous silicate solutions, in which case the corresponding metal salt is formed in situ. However, the sulphonation product can also be completely or partly neutralized at the outset, for example by the addition of amines such as triethylamine, trimethyl amine, methyl morpholine, pyridine, dimethyl aniline, metal alcoholates, for example Na-tert.-butanolate, K-isopropanolate and the like. Neutralization can also be carried out with metal oxides, hydroxides or carbonates either in solid form or suspended in diluents. Calcium oxide, magnesium oxide, calcium carbonate, magnesium carbonate and dolomite, for example, are particularly suitable.

Non-volatile, relatively high molecular weight tertiary amines are also particularly suitable for neutralization because they do not evaporate with the alkali silicate solution during the subsequent reaction. Products of this kind are, in particular, alkoxylation products of primary or secondary amines or even polyesters or polyacrylates with tert.-nitrogen atoms, also the known condensation products based on epichlorhydrin and polyamines of the kind used for example, for increasing the wet-strength of paper. It is preferred to use polycondensation products of weakly basic or sterically hindered amines because otherwise an excessive increase in viscosity can occur where polyamines are used.

The selection of suitable neutralizing agents is also determined by whether the neutralized or partially neutralized ionic polyisocyanate is to remain stable in storage over a prolonged period or whether it is to be reacted immediately with the alkali silicate solution to form the polyurea ionomer-silica gel. In the latter case, tertiary-amines of the kind which still contain reactive groups such as -OH, -NHR, -CO-, -NH$_2$, can also be safely used for neutralization. On account of the limited storage stability of the organic polyisocyanate which still contains reactive groups such as hydroxy groups, free nonneutralized carboxy-, urethane- and urea groups, it is generally advisable to prepare these modified isocyanates just before reaction. To produce storage-stable, organic polyisocyanates, groups of this kind should be blocked beforehand by reaction, for example with monoisocyanates.

Ionic modification may be carried out, for example, by jointly using a tertiary aminoalcohol such as dimethylaminoethanol or N-methyl diethanolamine, followed by quarternization with an alkylating agent. A salt of an amino acid or of an aminosulphonic acid for example can be used for anionic modification. Carboxy diols such as tartaric acid, dimethylolpropionic acid or adducts of acid anhydrides and their salts can also be used for the preparation of ionic organic polyisocyanates.

However, modified organic polyisocyanates known per se, as well as the prepolymers taught above, especially those based on aromatic polyisocyanates, can also be subsequently modified to give ionic groups, for example by reaction with sultones, β-lactones, by grafting on acrylic acid, methacrylic acid or crotonic acid, for example, or by sulphuric acid, chlorosulphonic acid, oleum or sulphur trioxide. In particular, organic polyisocyanates containing ionic groups eminently suitable for the process according to the invention, generally with high stability in storage, can also be obtained by reacting aromatic polyisocyanates, such as tolylene diisocyanates, diphenylmethane diisocyanates and the known phosgenation products of the condensation products of aromatic monoamines, especially aniline and aldehydes, especially formaldehyde, with sulphuric acid, oleum or sulphur trioxide. Sulphonated polyisocyanates of this kind which generally still contain uretdione-, urea-, biuret, and, in particular where polyol modification has been carried out before sulphonation, urethane- and/or allophanate groups which are formed through secondary reactions during sulphonation and which can stil be detected by IR-spectroscopy, are therefore particularly preferred as polyisocyanates containing ionic groups.

However, it is even better to use mixtures of di-, tri and higher polyisocyanates, for example, phosgenation products of aniline/formaldehyde condensation products which are characterized by a viscosity of from 50 to 10,000 preferably from 100 to 5000 centipoises at 25°C for sulphonation.

As previously mentioned, the -NCO prepolymers referred to above may also be modified to include ionic groups, for example, reaction products of 50 to 99 mols of aromatic diisocyanates with 1 to 50 mols of the usual glycols, monoamines, polyether glycols, polythioether glycols, polyester glycols, and the like. In this case, the ionic center can be introduced by the joint use of suitable glycols or even for example, by subsequent sulphonation, grafting on ethylenically unsaturated acids such as, for example, acrylic acid, maleic acid or crontonic acid, by reaction with sultones, β-lactones, or by other methods known per se.

Further, it can be said that the -NCO terminated prepolymer ionomers used, for example, for the production of aqueous polyurethane dispersions (U.S. Pat. Specification No. 3,756,992) can be used for the process according to the invention.

The invention contemplates the use of any suitable aqueous solution of an alkali metal silicate, containing 20–70% by weight of said alkali metal silicate, such as, for example, sodium silicate, potassium silicate or the like. Such aqueous silicates are normally referred to as "waterglass." It is also possible to use crude commercial-grade solutions which can additionally contain, for example, calcium silicate, magnesium silicate, borates and aluminates. The Me$_2$O:SiO$_2$ ratio is not critical and can vary within the usual limits, preferably amounting to 4-0.2. Me, of course, refers to the alkali metal. Preferably, sodium silicate with a molar ratio of Na$_2$O:SiO$_2$ between 1:1.6 and 1:3.3 is used. If the water content of the inorganic-organic end product initially obtained by reaction with the organic polyisocyanate is unimportant because it is chemically bound by the water-binding component as it is harmless or because it can readily be removed by drying, it is possible to use neutral sodium silicate from which 20 to 35% by weight solutions can be prepared. However, it is preferred to use 32 to 54% silicate solutions which, only if made sufficiently alkaline, have a viscosity of less than 500 poises at room temperature which is the limit required to ensure problemfree processing. Although ammonium silicate solutions can also be used, they are less preferred. The solutions can either be genuine solutions or even colloidal solutions.

The choice of the concentration of the aqueous silicate solution is governed above all by the required end product. Compact or closed-cell materials are preferably prepared with concentrated silicate solutions which, if necessary, are adjusted to low viscosity by the addition of alkali hydroxide. It is possible in this way to prepare 40% to 70% by weight solutions. On the other hand, 20% to 40% by weight silicate solutions are preferably used for the production of open-cell lightweight foams in order to obtain low viscosities, sufficiently long reaction times and low densities. Even in cases where finely divided inorganic fillers are used in relatively large quantities, 20% to 45% by weight silicate solutions are preferred.

It is also possible to make the silicate solution in situ by using a combination of solid alkali metal silicate and water.

Water-binding components used according to the invention include organic or inorganic water-binding substances which have first the ability to chemically combine, preferably irreversibly, with water and second the ability to reinforce the organic-inorganic end products of the invention. The most preferred water-binding agents of the invention, hold the water chemically bound until heated sufficiently, as in a fire. Thus, in a fire the water is released and extinguishes the fire. The term "water-binding component" is used herein to identify a material preferably granular or particulate which is sufficiently anhydrous to be capable of absorbing water to form a solid or gel such as mortar or hydraulic cement. This component may be a mineral or chemical compound which is anhydrous, such as CaO and $CaSO_4$ but may exist as a partial hydrate. The water-binding components preferably used are inorganic materials such as hydraulic cements, synthetic anhydrite, gypsum or burnt lime.

Suitable hydraulic cements are in particular Portland cement, quick-setting cement, blast-furnace Portland cement, mild-burnt cement, sulphate-resistant cement, brick cement, natural cement, lime cement, gypsum cement, pozzolan cement and calcium sulphate cement. In general, any mixture of fine ground lime, alumina and silica that will set to a hard product by admixture of water, which combines chemically with the other ingredients to form a hydrate may be used. The most preferred forms of water-binding agents to be used in accordance with the invention are those materials which are normally known as cement. In other words, they are a normally powdered material with which water normally forms a paste which hardens slowly and may be used to bind intermixed crushed rock or gravel and sand into rockhard concrete. There are so many different kinds of cement which can be used in the production of the compositions of the invention and they are so well known that a detailed description of cement will not be given here. However, one can find such a detailed description in *Encyclopedia of Chemical Technology*, Volume 4, Second Edition, Published by Kirk-Othmer, pages 684–710, as well as in other well known references in this field. In particular, pages 685–697 of the aforementioned Volume 4, Second Edition of Kirk-Othmer's Encyclopedia containing a detailed disclosure of the type of cement which may be used in the production of the compositions of this invention are incorporated herein by reference.

Production of the inorganic-organic compositions according to the invention is simple. It is merely necessary for the components to come together, for example, one may mix the organic polyisocyanate with the aqueous alkali silicate solution, and sufficient of the water-binding component unless the organic polyisocyanate also contains ionic groups, after which the mixture generally hardens immediately. The mixtures are typical finely divided emulsions or sols. They are not optically clear, but generally opaque or milky-white. The subsequent xerosol seems to be preformed in them.

Important advantages obtained according to the invention are the short mixing time, which amounts to between 2 seconds and at the most about 5 minutes when the components are mixed by a discontinuous process, and the rapid hardening time, which is generally less than 30 minutes.

In commercial production processes, these advantages can result in short molding times and hence rapid manufacturing cycles.

The mixture of the components, generally is not stable. The so-called "pot lives," during which the mixtures are processible, are governed above all by the amount and reactivity of the organic polyisocyanate and by the concentration of the silicate solution. The "pot life" is between 0.2 seconds and 2 days, it can be adjusted between 0.2 seconds and several hours (i.e., about 4 hours) or it can be between 2 second to about 1 hour. In the case of masked isocyanates which do not contain free -NCO groups, it is even possible to achieve pot lives of several hours up to about 2 days. Pot lives of from about 1 second to about 20 minutes are preferred as these times are most often suitable.

It follows from this that combination of the reactive starting materials is generally carried out immediately before forming. The polyurea-silica gel composite materials can be produced by previously known techniques, for example, in the same way as cast or foamed polyurethanes employing for example, a mixer such as is disclosed in U.S. Reissue Pat. No. 24,514. If the water-binding component is also included in the reaction mixture it is preferred to use a mixer such as is conventionally used in the building-construction trade, for example, for making mortar. Thus, a mixer with a large ribbon type blender can be used whereby the three components are simultaneously introduced into the mixer and then shortly after mixing the reacting components are poured onto a surface or into a mold where they are allowed to react to form the inorganic-organic compositions of the invention. Still further it is possible to simply mix the components in a container for example with a relatively low speed mixer as one would use to stir paint and then pour the components into another mold or to allow them to react in the container. It is also possible to use a kneader for the mixing of the components. Still further, one may mix the reacting components in an extruder which has one or more entrance ports so that components may be either simultaneously injected and mixed or they may be separately added to the extruder. For example, a premixture of the alkali metal silicate solution and the organic polyisocyanate may be mixed with the water-binding component or alternately it is possible to insert the three components one at a time into the extruder through separate ports and it is even possible to add an accelerator through a fourth port into the extruder.

It is important, if the water-binding component is present in the reaction mixture, that it be kept separate from the alkali metal silicate solution until it is time to allow the reaction mixture to react to completion. Thus, it is possible to mix the three essential components of this invention; namely, the organic polyisocyanate, the alkali silicate solution, and the water-binding component simultaneously or it is also possible to premix the water-binding component and the organic polyisocyanate component and then add the alkali metal silicate component. It is generally undesirable to mix the water-binding component and the alkali metal silicate component before the organic polyisocyanate is added because this can lead to preliminary solidification of the alkali metal silicate solution. Thus, it is preferred to either simultaneously mix all three of the essential components or first mix the organic polyisocyanate with either the alkali metal silicate solution or the water-binding component and then add the remaining ingredient to the mixture. Especially when isocyanates without ionic groups are used, the water-binding component at least in a considerable amount must be dispersed in the organic phase.

Furthermore in this case the amount of isocyanate should be at least 10 % by weight, based on the total weight of a), b) and c).

The quantitative ratios of the components is not critical in the production of the polyurea silica gel composite material except that where low amounts of water-binding components below 20% by weight are present the isocyanate must contain ionic groups. This is of particular advantage because it means that dosage does not have to be exact even in continuous production through metering devices and mixing chambers. Thus, it is even possible to use heavy-duty metering devices such as gear pumps.

The ratios of the essential reactants which lead to the inorganic-organic compositions of the invention may vary, broadly speaking, within ranges as follows:

a. from 5-98% by weight of the organic polyisocyanate (preferably containing ionic groups)

b. from 2-95% by weight of an aqueous alkali metal silicate solution containing about 20-70% by weight of said alkali metal silicate and c. from 0-93% by weight of a water-binding component, and d. from 1-30% by weight of a halogen or phosphorus containing compound, and
based on the total weight of (a), (b) and (c). When the water-binding component is present in amounts below about 20% by weight, it is necessary that the organic polyisocyanate contain 2-200 milliequivalents of ionic groups per 100 grams or said organic polyisocyanate as has been explained above. However, even for the higher amounts of the water-binding component it is preferred that the organic polyisocyanate also contain ionic groups as the combination of organic polyisocyanates with ionic groups and the water-binding component particularly the hydraulic cements or synthetic anhydrite, gypsum and burnt lime leads to the best results.

Thus, a preferred combination within the scope of the invention involves the reaction of components in the amounts within the following ranges:

a. 10-80% by weight of said organic polyisocyanate b. 20-80% by weight of said aqueous alkali metal silicate solution, and c. 10-70% by weight of said water-binding component, d. from 2-20% by weight of a halogen or phosphorus containing compound, based on the total weight of (a), (b) and (c).

A still more preferred composition is obtained from components in the following ranges:

a. 10-50% by weight of said organic polyisocyanate, b. 20-70% by weight of said alkali metal silicate solution, c. 20-70% by weight of said water-binding component and d. from 2-20% by weight of a halogen or phosphorus containing compound, based on the total weight of (a), (b) and (c).

The most preferred ranges of components are as follows:

a. 10-35% by weight of said organic polyisocyanate, b. 30-60% by weight of said alkali metal silicate solution, c. 30-60% by weight of said water binding component and d. from 2-20% by weight of a halogen or phosphorus containing compound, based on the total weight of (a), (b) and (c).

The reactants are preferably mixed at room temperature though any suitable temperature in the range of $-20°C$ to $80°C$ may be employed.

As stated above, it is strongly preferred to always have at least some ionic groups present in the organic polyisocyanate component. When this is so, the activity of the reaction mixture can be most easily adjusted by adjusting the ionic group content. In the case of polyisocyanates containing sulphonic acid groups or carboxylic acid groups, activity is mainly adjusted by varying the chemical nature and amount of the neutralization agent. Thus, if a low activity is desired, one may either not use any neutralizing agent and let the alkali metal silicate solution act as a neutralizer or one may use an inorganic solid neutralizing agent such as for example, calcium carbonate. Alternately, if one wishes to increase the activity so as to make the reaction extremely fast, one may choose a tertiary amine with the highest of basicity. If slightly less than an extremely fast reaction is desired, one may choose an amine of lower basicity or one may vary the amount of the neutralizer, i.e. the more the acid groups that are neutralized the faster is the reaction.

Products of low silicate content, for example, between 10 and 30% by weight are prepared when it is desired that the organic polymer properties should be predominant. In these products the silicate fraction reacts as a binding substance with the normally inactive fillers such as chalk, heavy spar, gypsum, anhydrite, clay, kaolin and the like.

Small quantities of silicate solutions can also be used in cases where it is required to harden an isocyanate prepolymer with water to form a pore-free homogeneous plastic provided said prepolymer contains ionic groups, if there is insufficient water-binding component present. Since the reaction of NCO-groups with water is known to be accompanied by the evolution of $CO_2$, in the absence of alkali metal silicate water can virtually only be used for the production of foams. In the presence of alkali metal silicate, the $CO_2$ formed is absorbed by the silicate. Thus, even in cases where waterglass solutions are used in standard polyurethane elastomer recipes, it is possible to prevent the formation of pores through liberated $CO_2$. Further, the reaction of organic polyisocyanate containing ionic groups with concentrated alkali metal silicate solutions, which may if desired by alkalized, leads to a product with considerably reduced pore formation and, providing the quantitative ratios which can be empirically determined without difficulty are adapted to one another, to a "water-extended" or "water-crosslinked," completely bubble-free material. Accordingly, high quality homogeneous polyureas can be obtained by a simple, solvent-free direct process. The required reaction velocity can readily be adjusted by varying the ionic group content. In the simplest case, this is done, for example, by sulphonation, if desired, followed by neutralization of the prepolymer.

According to the invention, foam materials with excellent fire resistance is obtained if the sum of inorganic constituents is more than 30% by weight but preferably more than 50% by weight, based on the total mixture.

High silicate contents, for example from 50% to 95% by weight, are desirable in cases where the properties of an inorganic silicate material, especially high-temperature stability and relatively complete non-inflammability, are essential requirements. In this case, the function of the organic polyisocyanate is that of a nonvolatile hardener whose reaction product is a high molecular weight polymer which reduces the brittleness of the product. By virtue of the elasticizing effect, organic polyisocyanates are superior to the conventional acid-based hardeners. The hardening times generally increase with decreasing ionic group content. However, it is of course, also possible to use organic polyisocyanates, in combination with acid-liberating hardeners. In this case, the reaction products of the organic polyisocyanates with water act mainly as elasticizing component. When using polyisocyanates without ionic groups but containing water-binding components the amount of aqueous silicate solution must not exceed 70% by weight.

Mixtures of organic polyisocyanates and aqueous silicate solutions containing more than 30% by weight of water are preferably used for the production of thin layers, for example, surface coatings or putties, adhesives, caulks and more particularly, for the production of foams.

In the production of foams by the process according to the invention, it is also advisable to use expanding or blowing agents. Any suitable blowing agent may be used including, for example, inert liquids boiling at temperatures of from −25 to +50°C. The blowing agents preferably have boiling points of from −15°C to +40°C. The blowing agents are preferably insoluble in the silicate solution. Particularly suitable blowing agents are alkanes, alkenes, halogen-substituted alkanes and alkenes or dialkyl ethers, such as for example saturated or unsaturated hydrocarbons with 4 to 5 carbon atoms such as isobutylene, butadiene, isoprene, butane, pentane, petroleum ether, halogenated saturated or unsaturated hydrocarbons such as chloromethyl, methylene chloride, fluorotrichloromethane, difluorodichloromethane, trifluorochloromethane, chloroethane, vinyl chloride, vinylidene chloride. Trichlorofluoromethane, vinyl chloride and $C_4$-hydrocarbons such as butane for example, have proved to be the most suitable.

Thus, any suitable highly volatile inorganic and/or organic substances may be used as a blowing agent, including those listed above. Additional suitable blowing agents are, for example, acetone, ethyl acetate, methanol, ethanol, hexane or diethylether. Foaming can also be achieved by adding compounds which decompose at temperatures above room temperature to liberate gases such as nitrogen for example, azo compounds, such as azoisobutyric acid nitrile. Other examples of blowing agents are included for example in Kunststoff-Handbuch, Volume VII, published by Vieweg and Hochtlen, Carl-Hanser-Verlag, Munich 1966, e.g. on pages 108 and 109, 453 to 455 and 507 to 510; but the water contained in the mixture may also function as blowing agent. Fine metal powders such as powdered calcium, magnesium, aluminium or zinc may also be used as blowing agents since they evolve hydrogen in the presence of waterglass which is sufficiently alkaline and, at the same time, have a hardening and reinforcing effect.

It has been found that blowing agents which contain fluorine such as those listed above exhibit a synergistic effect in that they not only function to foam the reaction mixture but also they have a special effect in that they decrease the surface tension of the organic phase. This is important because it makes it possible to obtain high quality products even with relatively small amounts of polyisocyanates. Furthermore, the use of a fluorine, containing blowing agent, such as the chloro fluoro alkanes listed above assists in creating a greater differential between the surface tension of the inorganic phase which is higher and the surface tension of the organic phase.

Thus, the best products of the invention are believed to be the ones where the organic phase is the continuous phase and the inorganic phase is a discontinuous or continuous phase and this may be brought about by the use of an amount of an organic polyisocyanate which is more than 20% by weight of the portion of the composition based on the organic polyisocyanate, the alkali metal silicate and the water-binding component, but it can be even less than 20% by weight where one employs a fluorine containing blowing agent because of the lower surface tension of the organic phase which leads to the results pointed out above. In other words, it is possible to get a continuous organic phase with lower amounts of organic polyisocyanate when one uses a fluorine containing blowing agent.

The blowing agents may be used in quantities of from up to 50% by weight and preferably in quantities of from 2 to 10% by weight, based on the reaction mixture.

Foams can, of course, also be produced with the assistance of inert gases, especially air. For example, one of the two reaction components can be prefoamed with air and then mixed with the other. The components can also be mixed for example, by means of compressed air so that foam is directly formed, subsequently hardening in molds.

Other substances, such as the emulsifiers, activators and foam stabilizers normally used in the production of polyurethane foams, can also be added. However, they are generally not necessary. An addition of silanes, polysiloxanes, polyether polysiloxanes or silyl-modified isocyanates, can intensify the interaction between the two phases. Examples of foam stabilizers are disclosed in U.S. Pat. No. 3,201,372 at Column 3, line 46 to Column 4, line 5.

Catalysts are often used in the process according to the invention. The catalysts used may be known per se, e.g. tertiary amines such as triethylamine, tributylamine, N-methyl-morpholine, N-ethyl-morpholine, N-cocomorpholine, N,N,N',N'-tetramethyl-ethylenediamine, 1,4-diaza-bicyclo-(2,2,2)-octane, N-methyl-N'-dimethylaminoethyl piperazine, N,N-dimethyl benzylamine, bis-(N,N-diethylaminoethyl)-adipate, N,N-diethyl benzylamine, pentamethyl diethylenetriamine, N,N-dimethyl cyclohexalamine, N,N,N',N'-tetramethyl-1,3-butanediamine, N,N-dimethyl-β-phenyl ethylamine, 1,2-dimethyl imidazole, 2-methyl imidazole and particularly also hexahydrotriazine derivatives.

The following are examples of tertiary amines containing hydrogen atoms which are reactive with isocyanate groups: triethanolamine, triisopropanolamine, N-methyl-diethanolamine, N-ethyl-diethanolamine, N,N-dimethyl-ethanolamine and their reaction products with alkylene oxides such as propylene oxide and/or ethylene oxide.

Silaamines with carbon-silicon bonds may also be used as catalysts, e.g. those described in German Pat. Specification No. 1,229,290, for example 2,2,4-trimethyl-2-silamorpholine or 1,3-diethylaminomethyl-tetramethyldisiloxane.

Bases which contain nitrogen such as tetraalkyl ammonium hydroxides, alkali metal hydroxides such as sodium hydroxide, alkali metal phenolates such as sodium phenolate or alkali metal alcholates such as sodium methylate may also be used as catalysts. Hexahydrotriazines are also suitable catalysts.

Organic metal compounds may also be used as catalysts according to the invention, especially organic tin compounds.

The organic tin compounds used are preferably tin (II) salts of carboxylic acids such as tin (II)-acetate, tin (II)-octoate, tin (II)-ethyl hexoate and tin (II)-laurate and the dialkyl tin salts of carboxylic acids such as dibutyl tin diacetate, dibutyl tin dilaurate, dibutyl tin maleate or dioctyl tin diacetate.

Other examples of catalysts which may be used according to the invention and details of the action of the catalysts may be found in Kunststoff-Handbuch, Volume VII, published by Vieweg and Hochtlen, Carl-Hanser-Verlag, Munich 1966 e.g. on pages 96 to 102.

The catalysts are generally used in a quantity of between about 0.001 and 10% by weight, based on the quantity of isocyanate.

Particularly high quality products are obtained by the process according to the invention where hardening is carried out at temperatures above 80°C, more particularly at temperatures of from 100°C to 200°C. Particularly in the case of combinations of organic polyisocyanates with 10% to 40% of NCO-groups and alkali silicate solutions, so much heat is liberated, even in the absence of applied heat, that the water present begins to evaporate. Temperatures up to 130°C are reached inside the foam blocks. The foregoing temperatures are only the preferred ones in the absence of water-binding components. If water binding components are present then the temperatures are usually lower, in most cases, for instance, between about 40° and about 100°C.

It would seem that particularly pronounced interactions and a particularly intimate bond between inorganic and organic polymer are developed under conditions such as these, resulting in the formation of materials which, on the one hand, are as hard as stone but which on the other hand are highly elastic and, hence, highly resistant to impact and breakage.

If the quantity of heat which is liberated during the reaction between the components is not sufficient to obtain optimum properties, mixing can readily be carried out at elevated temperature, for example at temperatures of from 40°C to 100°C. In special cases, mixing can also be carried out under pressure at temperatures above 100°C up to about 150°C in a closed container so that expansion occurs, accompanied by foam formation, as the material issues from the container.

Generally, production of the foams in accordance with the invention is carried out by mixing the described reaction components together either in one stage or in several stages in a batch-type or continuous mixer, and allowing the resulting mixture to foam and harden in molds or on suitable substrates, generally outside the mixer. The necessary reaction temperature amounting to between preferably about 0°C and 200°C and most preferably to between 40°C and 130°C, can either be achieved by preheating one or more reaction components before the mixing process or by heating the mixer itself or by heating the reaction mixture prepared after mixing. Combinations of these or other procedures for adjusting the reaction temperature are of course, also suitable. In most cases, sufficient heat is generated during the reaction itself so that, after the beginning of the reaction or foaming, the reaction temperature can rise to levels above 100°C.

For any given recipe, the properties of the resulting foams, for example, their moist density, is governed to some extent by the parameters of the mixing process, for example, the shape and rotational speed of the stirrer, the shape of the mixing chamber etc., and also by the reaction temperature selected for initiating foaming. The moist, fresh foam can have a density of approximately from 0.02 to 1.3 g/cc, although in general the moist fresh foam is obtained with densities of from 0.1 to 0.8 g/cc. The dried foams can have closed or open cells, although in most cases they are largely made up of open cells and have densities of from 0.02 to 1.1 g/cc. Where the waterbinding component is present, densities of 0.1 to 0.8 g/cc are preferred.

The foam material may have closed or open cells but is in most cases substantially open-celled and has a compression strength of between 5 and 150 kg/cm$^2$ when its density is between 0.1 and 0.8 g/cc.

The compression strength obtained according to the invention depend to a large extent on the proportions in which the starting components are mixed and on the resulting density, e.g. densities of between 200 and 600 kg/m$^2$ and compression strengths of 10 to 100 kg.wt/cm$^2$ are obtained when using a mixture of about equal parts of polyisocyanate, alkali metal silicate and water-binding filler if at the same time about 5% by weight (based on the total quantity) of a low-boiling blowing agent is used.

By virtue of the behavior of the reaction mixtures, the process according to the invention is provided with a number of potential utilities either as porous or homogeneous materials, and, accordingly, a few fields of application are outlined by way of example in the following. The possibility of leaving the water present in the hardened mixtures either as a required constituent of the foam, or of protecting the foam against the elimination of water by suitably coating or covering the foam with a water impermeable layer, or by removing all or some of the water by suitable drying techniques, for example, in a heating cabinet, or oven hot air, infrared heating, ultra-sonic heating or high-frequency heating, can be selected from case to case to suit the particular requirements of application.

The reaction mixture containing the blowing agent can be coated for example, onto any given warm, cold or even IR- or HF-irradiated substrates, or after passing through the mixer, can be sprayed with compressed air or even by the airless process onto these substrates on which it can foam and harden to give a filling or insulating coating. The foaming reaction mixture can also be molded, cast or injection-molded in cold or heated molds and allowed to harden in these molds, whether relief or solid or hollow molds, if desired by centrifugal casting at room temperature or temperatures of up to 200°C and if desired under pressure. In this respect, it is quite possible to use strengthening elements, whether in the form of inorganic and/or organic or metallic wires, fibers, webs, foams, woven fabrics, skeletons, etc. This can be done for example by the fiber-mat impregnating process or by processes in which reaction mixtures and strengthening fibers are applied together to the mold, for example, by means of a spray unit. The moldings obtainable in this way can be used as structural elements, for example, in the form of optionally foamed sandwich elements produced either directly or subsequently by lamination with metal, glass, plastics, etc., in which case the favorable flame behavior of the foams in their moist or dry form is of particular advantage. However, they can also be used as hollow bodies, for example, as containers for products that may have to be kept moist or cool, as filter materials or exchangers, as supports for catalysts or active substances, as decorative elements, as parts of furniture and as cavity fillings. They can also be used as high-stress lubricants and coolants or as carriers therefor, for example, in the extrusion of metals. They can also be used in the field of pattern and mold design, and also in the production of molds for casting metals.

In one preferred procedure, foaming is directly accompanied by hardening, for example by preparing the reaction mixture in a mixing chamber and simultaneously adding the readily volatile blowing agent, for example dichlorodifluoromethane, trichlorofluoromethane, butane, isobutylene or vinyl chloride, so that, providing it has a suitable temperature, the reaction mixture issuing from the mixing chamber simultaneously foams through evaporation of the blowing agent and hardens to its final foam form under the effect of the organic polyisocyanate, said foam optionally containing emulsifiers, foam stabilizers and other additives. In addition, the initially still thinly liquid reaction mixture can be expanded into a foam by the introduction of gases optionally under pressure such as air, methane, $CF_4$, noble gases, the resulting foam being introduced into the required mold and hardened therein. Similarly, the silicate- or organic polyisocyanate solution optionally containing foam stabilizers such as surfactants, foam formers, emulsifiers and, optionally, other organic or inorganic fillers or diluents, may initially be converted by blowing gas into a foam and the resulting foam subsequently mixed in the mixer with the other components and optionally with the hardener and the resulting mixture allowed to harden.

In one preferred procedure, a solution of the organic polyisocyanate in liquid expanding or blowing agent is mixed with the optionally preheated aqueous alkali silicate solution and thus hardened while foaming.

Instead of blowing agents, it is also possible to use inorganic or organic finely divided hollow bodies such as expanded hollow beads of glass or plastics, straw and the like, for producing foams.

The foams obtainable in this way can be used either in their dry or moist form, if desired after a compacting or tempering process, optionally carried out under pressure, as insulating materials, cavity fillings, packaging materials, building materials with outstanding resistance to solvents and favorable flame behavior. They can also be used as lightweight bricks or in the form of sandwich elements, for example, with metal covering layers, in house, vehicle and aircraft construction.

The reaction mixtures can also be dispersed in the form of droplets, for example, in petrol, or foamed and hardened during a free fall or the like, resulting in the formation of foam beads.

It is also possible to introduce into the foaming reaction mixtures, providing they are still free-flowing, organic and/or inorganic foamable or already foamed particles, for example expanded clay, expanded glass, wood, popcorn, cork, hollow beads of plastics, for example, vinyl chloride polymers, polyethylene, styrene polymers or foam particles thereof or even, for example, polysulphone, polyepoxide, polyurethane, ureaformaldehyde, phenol formaldehyde, polyimide polymers, or to allow the reaction mixtures to foam through interstitial spaced in packed volumes of these particles, and in this way to produce insulating materials which are distinguished by favorable flame behavior.

When a mixture of aqueous silicate solutions optionally containing inorganic and/or organic additives and the organic polyisocyanates has simultaneously added to it at a predetermined temperature the blowing agent which is capable of evaporation or of gas formation at these temperatures, for example a (halogenated) hydrocarbon, the initially liquid mixture formed can be used not only for producing uniform foams or non-uniform foams containing foamed or unfoamed fillers, it can also be used to foam through any given webs, woven fabrics, lattices, structural elements or other permeable structures of foamed materials, resulting in the formation of composite foams with special properties, for example, favorable flame behavior, which may optionally be directly used as structural elements in the building, furniture or vehicle and aircraft industries.

The foams according to the invention can be added to soil in the form of crumbs, optionally in admixture with fertilizers and plant-protection agents, in order to improve its agrarian consistency. Foams of high water content can be used as substrates for propagating seedlings, cuttings and plants or cut flowers. By spraying the mixtures onto impassable or loose terrain, for example, sand dunes or marshes, it is possible to obtain effective consolidation which soon becomes passable and offers protection against errosion.

It is also advantageous to spray the proposed reaction mixtures onto an article to be protected in the event of fire or accident, the water present being unable to run down or prematurely evaporate on the surface of the structure to be protected, so that particularly effective protection against fire, heat or radiation is obtained because the hardened mixture, providing it still contains water, cannot be heated to temperatures appreciably above 100°C and it also absorbs IR or nuclear radiation.

By virtue of their favorable spray properties, the mixtures can form effective protective walls and protective layers in the event of mining accidents and also in routine work, for example, by spraying them onto woven fabrics, other surfaces, lattices or even only onto walls. One particular advantage in this respect is that hardening is quickly obtained.

Similarly, the foaming mixtures can be used in construction engineering, in civil engineering and road building for erecting walls, igloos, seals, for filling joints, plastering, flooring, insulation, decoration and as a coating, screed and covering material. They can also be considered for use as adhesives or mortars or as casting compositions, optionally filled with inorganic or organic fillers.

Since the hardened foams obtained by the process according to the invention can show considerable porosity after drying, they are suitable for use as drying agents because they can absorb water. However, they can also be charged with active substances or used as catalyst supports or filters and absorbents.

Auxiliaries which may if desired be used in or subsequently introduced into the reaction mixture, such as emulsifiers, surfactants, dispersants, odorants, hydrophobizing substances, enable the property spectrum of the foams in their moist or dry form to be modified as required.

On the other hand, the foams can be subsequently lacquered, metallized, coated, laminated, galvanized, subjected to vapor deposition, bonded or flocked in their moist or dry form or in impregnated form. The moldings can be further processed in their moist or dried form, for example by sawing, milling, drilling, planing, polishing and other machining techniques.

The optionally filled moldings can be further modified in their properties by thermal aftertreatment, oxidation processes, hot-pressing, sintering processes or surface melting or other consolidation processes.

Suitable mold materials include inorganic and/or organic foamed or unfoamed materials such as metals, for example, iron, nickel, fine steel, lacquered or, for example, teflon-coated aluminium, porcelain, glass, wood, plastics such as PVC, polyethylene, epoxide resins, ABS, polycarbonate etc.

The foams obtainable in accordance with the invention can be surface-treated or, where they are in the form of substantially permeable structures, for example substantially open-cell foams or porous materials, can even be treated by centrifuging, vacuum treatment, blowing air through or by rinsing with (optionally heated) liquids or gases which remove the water present, such as methanol, ethanol, acetone, dioxan, benzene, chloroform and the like, or dried with air, $CO_2$, or super heated steam. Similarly, the moist or dry moldings can also be aftertreated by rinsing or impregnating with aqueous or non-aqueous acid, neutral or basic liquids or gases, for example, hydrochloric acid, phosphoric acid, formic acid, acetic acid, ammonia, amines, organic or inorganic salt solutions, lacquer solutions, solutions of polymerizable or already polymerized monomers, dye solutions, galvanizing baths, solutions of catalysts or catalyst preliminary stages, ordorants and the like.

The new composite materials are particularly suitable for use as structural materials because they show tensile and compressive strength, are tough, rigid and at the same time elastic, show high permanent dimensional stability when hot and are substantially non-inflammable.

Thus, it is possible, for example, to produce high quality lightweight structural panels either by continuously cutting or sawing foamed blocks into corresponding panels or by foaming panels of this kind and, in particular, complicated moldings in molds, optionally under pressure. It is also possible by adopting a suitable procedure to produce molding with an impervious outer skin.

When a technique of foaming in a mold under pressure is employed, molded parts with dense marginal zones and completely non-porous smooth surfaces can be obtained.

However, the process according to the invention is particularly suitable for in situ foaming on the building site. Thus, any types of hollow mold, of the kind made by formwork in the usual way, can be cast or filled with foam.

The reaction mixture can also be used to fill cavities, gaps, cracks, giving a very firm bond between the joined materials. Insulating internal plasters can also be readily produced by spraying on the reaction mixture.

In many cases, the materials obtained can be used instead of wood or hard-fiber boards. They can be sawed, rubbed down, planed, nailed, drilled, milled and in this way, can be worked and used in a number of different ways.

Very brittle lightweight foams of the kind which can be obtained for example by having a very high silicate content or by combination with equally brittle organic polymers, can readily be converted by crushing in suitable machines into dustfine powders which can be used for a number of different purposes as organically-modified silica fillers. Organic-modification provides effective surface interaction with polymers and, in some cases, also a certain degree of surface thermoplasticity which makes it possible to produce high quality molding compositions on which topochemical surface reactions can be carried out by the addition of crosslinking agents.

Fillers in the form of particulate or powdered materials can be additionally incorporated into the mixtures of organic polyisocyanates and alkali silicates for a number of applications.

Suitable fillers include solid inorganic or organic substances, for example, in the form of powders, granulate, wire, fibers, dumb bells, crystallites, spirals, rods, beads, hollow beads, foam particles, webs, pieces of woven fabric, knit fabrics, ribbons, pieces of film etc., for example, of dolomite, chalk, alumina, asbestos, basic silicas, sand, talcum, iron oxide, aluminum oxide and oxide hydrate, zeolites, calcium silicates, basalt wool or powder, glass fibers, C-fibers, graphite, carbon black, Al-, Fe-, Cu-, Ag-powder, molybdenum sulphite, steel wool, bronze or copper cloth, silicon powder, expanded clay particles, hollow glass beads, glass powder, lava and pumice particles, wood chips, sawdust, cork, cotton, straw, jute, sisal, hemp, flax, rayon, popcorn, coke, particles of filled or unfilled, foamed or unfoamed, stretched or unstretched organic polymers including plastics and rubber waste. Of the number of suitable organic polymers, the following, which can be present for example, in the form of powders, granulate, foam particles, beads, hollow beads, foamable or unfoamed particles, fibers, ribbons, woven fabrics, webs etc., are mentioned purely by way of example: polystyrene, polyethylene, polypropylene, polyacrylonitrile, polybutadiene, polyisoprene, polytetrafluoroethylene, aliphatic and aromatic polyesters, melamine-urea or phenol resins, polyacetal resins, polyepoxides, polyhydantoins, polyureas, polyethers, polyurethanes, polyimides, polyamides, polysulphones, polycarbonates, and of course any copolymers as well. Inorganic fillers are preferred.

Generally, the composite materials according to the invention can be filled with considerable quantities of fillers without losing their valuable property spectrum. The amount of fillers can exceed the amount of the components (a), (b) and (c). In special cases the inorganic-organic composition of the present invention acts as a binder for such fillers.

In cases where higher amounts of fillers are used it may be advisable to add water in order to obtain sufficient working properties, coarse fillers can be used in wet form, powdered fillers such as e.g. chalk, alumina, dolomite, calcium hydroxide, magnesium carbonate, calciumcarbonate can be used also as an aqueous suspension.

Products of low silicate content are particularly suitable for the production of quick-hardening high quality surface coatings which show outstanding adhesion and resistance to abrasion, and for the production of elastomers of high strength and high modulus.

For applications such as these, it is preferred to use isocyanato-prepolymer ionomers of low isocyanate content, for example, less than 5% or even prepolymers which have masked isoycanate groups. It is possible in this way to obtain mixtures with a long pot life which can also be applied in the form of thin layers gradually hardening with time.

If only a small amount of $CO_2$ is liberated (by correct adjustment of proportions and activity) a pasty or doughy plastic material which can be formed in any way is obtained with partial hardening, which is accompanied by an increase in viscosity. This material can be formed and hardened at a later stage, for example, by drying in air or by heating.

Such a two-stage or multi-stage hardening process is of particular interest so far as processing as a putty, trowelling composition, gap-filling compound, mortar and the like, is concerned. In the first stage of this hardening process, for example, there is a rapid evolution of $CO_2$ (for example by the reaction of NCO-groups with water) which converts the inorganic organic composite material into a plastic or thermoplastic processable form, hardening taking place in a second, slower hardening stage, for example through the hydrolysis of a high molecular weight or low molecular weight ester.

The thermoplastic intermediate stage can also be processed by injection molding, extrusion or kneading.

In many cases, these intermediate stages can also be mixed with water, organic solvents, plasticizers, extending agents, fillers, and thus modified and applied in a number of different ways.

The materials according to the invention are also suitable for use as impregnating agents for finishing fibers, for which purpose it is possible both to use completed mixtures of the organic and of the silicate component, and to apply a twobath treatment. Accordingly, the component with the better adhesion, i.e., the prepolymer component, is preferably initially applied to organic material, and the silicate component to inorganic material.

In addition, it is possible, for example by extruding the mixtures through dies or slots, to produce fibers and films which can be used for example, for the production of synthetic non-inflammable paper or for the production of webs.

The foam material according to the invention is capable either of absorbing water and/or water vapor or of affording considerable resistance to the diffusion of water and/or water vapor, depending on the composition and structure of the material.

The foam material according to the invention opens up new possibilities in the fields of underground and surface engineering and in the production of finished parts and elements.

The following are mentioned as examples of the possibilities of application: the manufacture of wall elements for prefabricated buildings, sand molds, roller shutter casings, window-sills, railroad and underground sleepers, curbstones, stairs, the filling of joints by foaming and the backfilling of ceramic tiles by foaming.

The foam material may also advantageously be used for binding gravel and marble chips, etc.; decorative panels can be obtained in this way which can be used, for example, as facades.

The invention will now be described in more detail with the aid of examples.

Examples

The following components were used:

A: sulphonated polyphenyl-polymethylene-polyisocyanate obtained by aniline-formaldehyde condensation followed by phosgenation and sulphonation with gaseous sulphur trioxide (sulphur content: 0.98%, isocyanate content: 30.2%, viscosity 1200 cP at 22°C; U.S. Ser. No. 363,436 filed May 24, 1973, B: aqueous sodium silicate solution (44% solids content, $SiO_2:Na_2O = 2:1$), C: N,N,N-ω-dimethylamine-n-propyl) hexahydrotriazine as catalyst, D: Residue of tolylene diisocyanate distillation, approximately 20 % by weight NCO.

EXAMPLE 1

The following components were used:

| | |
|---|---|
| 2800 g of sulphonated polyisocyanate A | |
| 308 g of trichlorofluoromethane, | |
| 1400 g of quick-setting cement, | |
| 700 g of chlorinated paraffin mixture | component A |
| (Witaclor 71 of Dynamit Nobel), | |
| 70 g of glassfibers (3 mm in length), | |
| 2100 g of sodium silicate solution B | |
| 1400 g of quick-setting cement, | component B |
| 42 g of catalyst C | |

The ingredients of component A and the ingredients of component B were mixed separately very vigorously and the two components were then mixed together with a high-speed stirrer for 30 seconds and poured into a wax-lined wooden mold measuring 50 × 50 × 50 cm$^3$ which could be closed. Witaclor 71 typically contains 70 to 72 percent chlorine and a viscosity at 20°C of 71,000,000 cp.

The product was removed from the mold after 10 minutes. It consisted of a foam concrete part which had a completely smooth, non-porous surface and could be seen to have integrally compacted marginal zones. It had an overall density of 543 kg/m$^3$ and a compression strength of 92.8 kg.wt./cm$^2$.

In the fire resistance test carried out in the burning chamber in accordance with DIN 4102 (small fire test)

this 5 cm thick foam concrete panel was found to have a fire resistance time of over 50 minutes.

EXAMPLE 2

Component 1:
 150 g of a 20% solution of TDI residue D in MDI as in Example 15 (NCO content 30%, viscosity 1900 centipoises),
 30 g of a perchlorinated paraffin (trade name "Witaclor 63" of the firm of Dynamit Nobel, Germany),
 300 g of a quick-setting cement,
 34 g of trichlorofluoromethane are mixed while stirring to form a highly fluid paste.

Component 2:
 200 g of a 44% aqueous sodium silicate solution ($Na_2O:SiO_2$ molar ratio 1:2),
 100 g of quick-setting cement,
 4 g of triethylamine are mixed while stirring to form a highly fluid paste. To produce the foam concrete both components are thoroughly mixed for 15 seconds. The emulsion begins to foam after 20 seconds, the foam solidifies after 28 seconds and reaches 90°C after 45 seconds with the evolution of steam. A very fine-celled, hard foam concrete is obtained. Witachlor 63 typically contains 62 to 64 percent chlorine and a viscosity at 20°C of about 40,000 cp.
 Density 366 kg/cu.meter
 Compression Strength 20 kg.wt./sq.centimer

EXAMPLE 3

Component 1
 150 g of a 20% solution of TDI residue in MDI as in Example 2, (NCO content 30%, viscosity 1900 centipoises),
 10 g of sulphonated polyisocyanate according to Example 1,
 30 g of a perchlorinated paraffin according to Example 2,
 350 g of quick-setting cement,
 40 g of trichlorofluoromethane are mixed while stirring to a highly fluid paste.

Component 2:
 200 g of a 44% aqueous sodium silicate solution ($Na_2O:SiO_2$ molar ratio 1:2,
 150 g of quick-setting cement,
 3 g of triethylamine
are mixed while stirring to form a highly fluid paste. To produce the foam concrete both components are thoroughly mixed for 15 seconds. The emulsion begins to foam after 30 seconds and the foam solidifies after 45 seconds. A very fine-celled, hard foam concrete is obtained which is not combustible and shows considerable resistance to fire over a long period of time.
 Density 444 kg/cu.meter
 Compression Strength 30 kg.wt./sq. centimeter

EXAMPLE 4

Component 1:
 150 g of a 30% solution of TDI residue in MDI as in Example 2 (NCO content 29.9%, viscosity 18,000 centipoises),
 30 g of sulphonated polyisocyanate according to example 1,
 40 g of tris-(chloro-ethyl)-phosphate,
 10 g of a perchlorinated paraffin according to Example 2,
 100 g of quick-setting cement,
 30 g of trichlorofluoromethane Component 2:
 200 g of a 44% aqueous sodium silicate solution ($Na_2O:SO_2$ molar ratio 1:2),
 100 g of quick-setting cement,
 1.5 g of triethylamine,
After mixing the components a coarse-pored hard foam is obtained.
 Density 218 kg/cu.meter
 Compression Strength 13 kg.wt./sq.centimeter

EXAMPLE 5

Component 1:
 150 g of a 30% solution of TDI residue in MDI as in Example 2,
 40 g of sulphonated polyisocyanate according to Example 1,
 40 g of a perchlorinated paraffin according to Example 2,
 10 g of tris-(chloro-ethyl phosphate),
 225 g of quick-setting cement,
 45 g of trichlorofluoromethane Component 2:
 320 g of a 44% aqueous sodium silicate solution ($Na_2O:SiO_2$ molar ratio 1:2),
 200 g of quick-setting cement,
 3 g of triethylamine
Both components are first mixed on their own, then thoroughly mixed together for 15 seconds. The composition foams after 34 seconds and solidifies after 52 seconds. The resultant foam concrete is 78 % by weight inorganic and contains 17 % of a continuous polyurea matrix of which 4 % stems from residual isocyanate.

The resultant foam concrete exhibits excellent resistance to the effect of fire. It develops very little combustible pyrolysis gases and is found to be non-combustible even when subjected to fire over a prolonged period. On the surface a carbon film forms from the polyurea matrix and this greatly checks the development of decomposition under carbonization. As a result the foam concrete possesses excellent resistance to fire. When for example exposed for more than an hour to the action of an oxidizing flame, a purely inorganic silicate foam is left which is likewise found to have excellent insulating properties.
 Density 406 kg/cu.meter
 Compression Strength 12.4 kg.wt./sq.centimeter

EXAMPLE 6

Component 1:
 150 g of a 30% solution of TDI residue as in Example 2,
 40 g of sulphonated polyisocyanate according to Example 1,
 40 g of a perchlorinated paraffin according to Example 2,
 10 g of tris-(chloro-ethyl phosphate),
 180 g of calcium oxide,
 40 g of Portland cement,
 45 g of trichlorofluoromethane Component 2:
 320 g of a 44 % aqueous sodium silicate solution ($Na_2O:SiO_2$ molar ratio 1:2),
 200 g of quick-setting cement,
 3 g of triethylamine
Upon foaming, a product is obtained which substantially corresponds to the product in Example 5 as regards its properties. However, in contrast to that product the foam is very hot after it solidifes (approx. 110°C) and gives off a considerable amount of steam.

Density 594 kg/cu.meter

Compression Strength 40.5 kg./wt.

values ascertained 2 hours after production of foam

It is to be understood that the foregoing Examples are given for the purpose of illustration and that any other suitable polyisocyanate, alkali metal silicate, water-binding component or the like can be substituted therein provided the teachings of this disclosure are followed.

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention except as it may be limited by the claims.

What is claimed is:

1. An inorganic-organic composition obtained by reacting a mixture of:
   A. from 5-98% by weight of an organic polyisocyanate,
   B. from 95-2% by weight of an aqueous alkali metal silicate solution containing about 20-70% by weight of said alkali metal silicate,
   C. from 0-93% by weight of an inorganic water-binding component, said water-binding component being capable of absorbing water to form a solid or a gel, and based on the total weight of components (A), (B) and (C),
   D. from 1-30% by weight of a halogen or phosphorus containing compound,
   with the proviso that when component (C), is from 0-20% by weight, component (A) contains 2-200 milliequivalents of ionic groups or groups capable of forming ionic groups in the presence of alkali metal silicates per 100 grams of said organic isocyanate, and wherein said composition is a solid/solid xerosol.

2. The composition of claim 1, with the further proviso that at least enough water is present in the reaction mixture to combine with substantially all of component (C).

3. The composition of claim 1, wherein the organic polyisocyanate contains ionic groups or groups capable of forming ionic groups in the presence of alkali metal silicates.

4. The composition of claim 3, wherein the organic polyisocyanate contains from 2-200 milliequivalents of ionic groups or groups capable of forming ionic groups in the presence of alkali metal silicates per 100 grams of organic polyisocyanate.

5. The composition of claim 1, wherein the aqueous silicate solution contains 32-54% by weight silicate and the ratio by weight of polyisocyanate to silicate is from 70:30 to 20:80.

6. The composition of claim 1, wherein an inert liquid boiling at temperatures of −25°C to +50°C is included in the reaction mixture as a blowing agent in a quantity of up to 50% by weight, and the reaction mixture is allowed to react to completion while foaming.

7. The solid/solid xerosol composition of claim 1, in which the average transverse diameter of the dispersed phase is between 20 nm and 2 microns.

8. The composition of claim 7, which contains glass fibers.

9. The product of claim 7, wherein the said average diameter is between 50 nm and 700 nm.

10. The composition of claim 7, wherein both phases are coherent.

11. The composition of claim 7, containing an inert inorganic or organic particulate or powder filler material.

12. The composition of claim 1, where said composition is based on:
   A 10-80% by weight of said organic polyisocyanate,
   B 20-80% by weight of said aqueous alkali metal silicate solution,
   C 10-70% by weight of a water-binding component, and, based on the total weight of components (A), (B) and (C),
   D 2-20% by weight of halogen or phosphorus containing compound.

13. The foamed composition of claim 12, wherein the mixture contains a blowing agent.

14. The foamed composition of claim 13, wherein the blowing agent is a halogenated hydrocarbon with a boiling point below 100°C.

15. The composition of claim 12, wherein the mixture contains an activator which accelerates the reaction of isocyanate groups with water.

16. The composition of claim 15, wherein the activator is a tertiary amine.

17. The composition of claim 12, wherein the reaction mixture contains a foam stabilizer.

18. The composition of claim 12, wherein the reaction mixture contains an emulsifying agent.

19. The composition of claim 12, wherein the mixture contains an inert inorganic particulate or fibrous filler material.

20. The composition of claim 12, wherein the mixture contains an inert organic particulate or fibrous filler material.

21. The composition of claim 12, wherein the mixture contains an organic compound containing hydrogen atoms which are reactive with isocyanate groups.

22. The composition of claim 12, wherein the alkali metal silicate is sodium silicate in which the molar ratio of $Na_2O:SiO_2$ is within the range of 1:1.6 and 1:3.3.

23. The composition of claim 12, wherein the polyisocyanate is an organic prepolymer which contains ionic groups or groups capable of forming ionic groups in the presence of alkali metal silicates.

24. The composition of claim 12, wherein the polyisocyanate contains sulphonic acid and/or sulphonate groups.

25. The composition of claim 12, wherein the water-binding component is a hydraulic cement, synthetic anhydrite, gypsum or burnt lime.

26. The composition of claim 12, wherein said composition is based on:
   A 10-50% by weight of said organic polyisocyanate, B 20-70% by weight of said alkali metal silicate solution, C 20-70% by weight of a water-binding component, and, based on the total weight of components (A), (B) and (C), D 2-20% by weight of a halogen or phosphorus containing compound.

27. The composition of claim 12, wherein said composition is based on:

A 10-35% by weight of said organic polyisocyanate,

B 30-60% by weight of said alkali metal silicate solution,

C 30-60% by weight of a water-binding component and, based on the total weight of components (A), (B) and (C), D 2-20% by weight of a halogen or phosphorus containing compound.

28. A process for producing an inorganic-organic composition comprising:

A from 5-98% by weight of an organic polyisocyanate,

B from 95-2% by weight of an aqueous alkali metal silicate solution containing about 20-70% by weight of said alkali metal silicate, C from 0-93% by weight of an inorganic water-binding component, said water-binding component being capable of absorbing water to form a solid or a gel, and based on the total weight of components (A), (B) and (C), D from 1-30% by weight of a halogen or phosphorus containing compound, with the proviso that when component (C), is from 0-20% by weight, component (A) contains 2-200 milliequivalents of ionic groups or groups capable of forming ionic groups in the presence of alkali metal silicates per 100 grams of said organic isocyanate, and wherein said composition is a solid/solid xerosol.

* * * * *